US007777859B2

(12) United States Patent
Zolla et al.

(10) Patent No.: US 7,777,859 B2
(45) Date of Patent: Aug. 17, 2010

(54) TWO-STAGE EXPOSURE DEVICE FOR WATERMARKING FILM

(75) Inventors: Robert J. Zolla, Rochester, NY (US); Paul W. Jones, Churchville, NY (US); John A. Heath, Victor, NY (US); Thomas F. Powers, Webster, NY (US); Scott P. MacKenzie, Brockport, NY (US)

(73) Assignee: Eastman Kodak Company, Rochester, NY (US)

( * ) Notice: Subject to any disclaimer, the term of this patent is extended or adjusted under 35 U.S.C. 154(b) by 1868 days.

(21) Appl. No.: 10/840,481

(22) Filed: May 6, 2004

(65) Prior Publication Data

US 2005/0248813 A1 Nov. 10, 2005

(51) Int. Cl.
*B41J 2/447* (2006.01)
*G03B 27/54* (2006.01)

(52) U.S. Cl. ................................ 352/46; 355/67; 349/4; 347/233

(58) Field of Classification Search .................. 353/30, 353/31, 94; 352/46; 355/67, 70, 77; 396/332, 396/335; 349/2, 4, 3; 358/3.28, 3.2; 347/233; 382/100, 114, 141, 321; 705/39, 65–79
See application file for complete search history.

(56) References Cited

U.S. PATENT DOCUMENTS

| | | | | |
|---|---|---|---|---|
| 3,819,376 | A | 6/1974 | Land | |
| 4,172,640 | A | 10/1979 | Land | |
| 5,752,152 | A | 5/1998 | Gasper et al. | |
| 6,215,547 | B1 * | 4/2001 | Ramanujan et al. | 355/67 |
| 6,239,818 | B1 | 5/2001 | Yoda | |
| 6,438,231 | B1 | 8/2002 | Rhoads | |
| 6,882,356 | B2 * | 4/2005 | Roddy et al. | 347/224 |
| 6,930,759 | B2 * | 8/2005 | Roddy et al. | 355/67 |
| 7,123,740 | B2 * | 10/2006 | McKinley | 382/100 |
| 7,221,383 | B2 * | 5/2007 | MacKenzie et al. | 347/251 |
| 2002/0106103 | A1 * | 8/2002 | Jones et al. | 382/100 |
| 2003/0012569 | A1 | 1/2003 | Lowe et al. | |
| 2003/0161042 | A1 * | 8/2003 | Long | 359/566 |
| 2004/0121131 | A1 * | 6/2004 | Yamaguchi et al. | 428/195.1 |
| 2004/0257382 | A1 * | 12/2004 | van der Zijpp | 345/629 |

* cited by examiner

*Primary Examiner*—William C Dowling
(74) *Attorney, Agent, or Firm*—Nelson A. Blish

(57) ABSTRACT

An apparatus (20) forms a latent indicium onto a sensitized medium, using an area energy source (26) for applying a substantially uniform sensitizing energy over an area of the sensitized medium and a pixel exposure source (30) for applying radiant energy to expose a pattern of pixels (14) onto the area of the sensitized medium for forming the indicium.

101 Claims, 7 Drawing Sheets

TWO-STAGE EXPOSURE DEVICE FOR WATERMARKING FILM

CROSS REFERENCE TO RELATED APPLICATIONS

Reference is made to commonly-assigned U.S. patent application Ser. No. 10/364,488, filed Feb. 11, 2003, entitled METHOD AND APPARATUS FOR WATERMARKING FILM, by Roddy et al.; U.S. patent application Ser. No. 10/742,167, filed Dec. 19, 2003, entitled METHOD OF IMAGE COMPENSATION FOR WATERMARKED FILM, by Zolla et al.; U.S. patent application Ser. No. 10/778,528, filed Feb. 13, 2004, entitled WATERMARKING METHOD FOR MOTION PICTURE IMAGE SEQUENCE, by Jones et al.; and U.S. patent application Ser. No. 10/807,491, filed Mar. 23, 2004, entitled MOTION PICTURE WATERMARKING USING TWO COLOR PLANES, by Zolla et al., the disclosures of which are incorporated herein.

FIELD OF THE INVENTION

This invention generally relates to application of latent indicia such as digital watermarks onto photosensitive media and more particularly relates to an improved method and apparatus for providing a watermark using at least two separate exposure stages.

BACKGROUND OF THE INVENTION

An unfortunate result of technological advances in image capture and reproduction is illegal copying and distribution of image content, in violation of copyright. One solution for counteracting illegal copying activity is the use of image watermarking as a forensic tool. Sophisticated watermarking techniques enable identifying information to be encoded within an image. A digital watermark can be embedded in the image beneath the threshold of visibility to a viewer, yet be detectable under image scanning and analysis. Examples include: U.S. Pat. No. 6,496,818 (Yoda) which discloses embedding a pattern in a color print and adjusting cyan, magenta, yellow, black (CMYK) values such that the embedded data matches the color of the surround when viewed under a standard illuminant; commonly-assigned U.S. Pat. No. 5,752,152 (Gasper et al.) discloses a pattern of microdots, less than 300 μm in diameter, for marking a photographic print that is subject to copyright.

Illegal copying is a particular concern to motion picture studios and distributors, and represents a significant loss of revenue. Watermarking of motion picture images would enable the source of an illegal copy to be tracked and would thus provide a deterrent to this activity.

While a number of different approaches have been attempted for watermark application to motion pictures, there is considerable room for improvement. For photosensitive media in general, it is known that a watermark encoding can be added to the image frame at the same time that image content is printed. However, it is also possible to expose a watermark at other times during processing of the photosensitive medium. For example, as is disclosed in U.S. Patent Application No. 2003/0012569 (Lowe et al.), a latent watermark image can be exposed onto the "raw" photosensitive medium itself, at the time of manufacture. Then, when the medium is exposed with image content, the image frame is effectively overlaid onto the watermark pattern. Such a method is also disclosed in U.S. Pat. No. 6,438,231 (Rhoads).

U.S. Pat. No. 6,438,231 discloses this type of pre-exposure of the watermark onto the film emulsion within the frame area of negative film, for example.

It can be appreciated that watermark pre-exposure would have advantages for marking motion picture film at the time of manufacture or prior to exposure with image content. A length of motion picture film could be pre-exposed with unique identifying information, encoded in latent fashion, that could be used for forensic tracking of an illegal copy made from this same length of film. However, prior art watermarking techniques proposed for photosensitive media in general fall short of what is needed for motion picture watermarking. In particular, prior art techniques are not well-adapted for applying a watermark pattern during high-speed film manufacture. Problems that make it difficult or impractical to use conventional watermark application techniques for pre-exposure of film in manufacture relate to both throughput requirements and image quality. Among the problems with watermark application in high-speed manufacturing environments are the following:

(a) Energy requirements. Exposure is a product of the intensity of applied radiant energy and time. With film moving at high speeds, very little time can be allotted for exposure of a watermark; consequently, the intensity of the exposing light source used must be very high. Providing light having the intensities needed to expose small areas at film movement speeds, however, presents a formidable technical challenge. High overall energy requirements add cost and complexity to the job of applying watermark exposure. Heat dissipation can also become a problem.

(b) Exposure control. Modulation of light amplitude at high levels, with sufficiently accurate control over relative intensity levels, presents challenging technical problems, making it difficult to provide watermark pixels at varying densities. At the high light energy levels needed for high-speed watermark application, for example, a 10% error in output intensity can cause excessive noise and render watermark modulation unusable. The expense of obtaining precision, high-intensity light components or of using extensive feedback controls to counter this problem could be prohibitive.

(c) Imaging artifacts due to pixel-to-pixel exposure energy level imbalances between adjacent exposure sources. Forming a watermark exposure using digital imaging typically requires an array of exposure sources, from pixel forming devices such as LED arrays, for example. Adjacent pixel exposure sources must be closely matched for energy output; otherwise, linear artifacts such as banding can occur.

(d) Imaging artifacts due to pixel placement errors. Pixel spatial placement can be imperfect, causing recurring gaps or overlaps between adjacent pixels that could cause undesirable image artifacts.

(e) Imaging artifacts due to pixel shape anomalies. In addition to differences in relative placement, adjacent pixels may also vary in size. This type of condition may result in banding or other perceptible effects on the watermark image that are not masked by image content. Imaging artifacts may be enhanced by the contrast of the photosensitive medium.

Thus, it can be appreciated that techniques that reduce energy requirements and minimize the impact of pixellization artifacts would be useful for digital watermark application in a high-speed film manufacturing environment.

It can be appreciated that watermark exposure, including pre-exposure for example, would have advantages for marking motion picture film at the time of manufacture or prior to exposure with image content. A length of motion picture film could be pre-exposed with unique identifying information, encoded in latent fashion, that could be used for forensic tracking of an illegal copy made from this same length of film.

In addition to watermarks, other types of latent images can be exposed onto a photosensitive medium, such as at the time of manufacture or at the time of filming. With this in mind, it can be appreciated that methods adopted for watermark application may also be well suited for forming other types of latent images, including time stamps, batch identifiers, and other types of indicia, or discriminating marks, that would be useful to the manufacturer, processor, or end user of film and other sensitized media. These latent images are typically within the image area of the sensitized media; however, latent images could alternately be formed along borders or edges of the media, wholly or partially outside the image area.

Given these considerations, it can be seen that improvements to conventional approaches for watermark application would be advantageous, particularly where there is a need to apply a latent watermark pattern during film manufacture and with other high-speed film handling systems.

SUMMARY OF THE INVENTION

It is an object of the present invention to provide a method for exposure of a watermark or other type of latent image that is particularly suited to high-speed manufacture of motion picture film. With this object in mind, the present invention provides an apparatus for forming a latent indicium onto a sensitized medium, comprising:

(a) an area energy source for applying a substantially uniform sensitizing energy over an area of the sensitized medium; and (b) a pixel exposure source for applying radiant energy to expose a pattern of pixels onto the area of the sensitized medium for forming the indicium thereby.

From another aspect, the present invention provides an apparatus for forming a watermark pattern onto a photosensitive medium, comprising:

(a) an area energy source for applying a substantially uniform sensitizing energy over an area of the photosensitive medium; and (b) a watermark pixel exposure source for exposing a plurality of watermark pixels onto the area of the photosensitive medium for forming a watermark pattern thereby.

It is a feature of the present invention that it provides both an essentially uniform sensitizing energy over the full area of the photosensitive medium and a pixel-wise exposure energy for forming a specific pixel pattern. The uniform exposure energy and pixel-wise exposure energy can be applied in any temporal order relative to each other as well as simultaneously.

It is an advantage of the present invention that it allows a watermark to be applied to a photosensitive medium that is being processed at high speeds.

It is a related advantage of the present invention that it eliminates the need for high-intensity pixel exposure sources to compensate for the short exposure time available for the watermark; additionally, the method of the present invention does not require as precise control of watermark intensity levels as would be needed using only high-intensity sources.

It is a related advantage of the present invention that it provides a lower-cost apparatus and method for watermark application than would be available using conventional techniques.

It is a further advantage of the present invention that it provides a robust method for watermark application, with reduced sensitivity to pixel patterning, inter-pixel gaps, and pixel overlap anomalies. The apparatus and method of the present invention also help to minimize the adverse impact of pixel-to-pixel exposure variations when exposing the watermark pattern.

It is yet a further advantage of the present invention that it helps to minimize unwanted density variations that can occur when applying both a watermark pattern and scene content onto a photosensitive medium.

It is yet a further advantage of the present invention that, since it minimizes the visual impact of pixel patterning anomalies, it relaxes requirements for precision pixel placement and for balancing of adjacent pixel-to-pixel exposure sources.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Early adopters of photographic technology discovered various methods for adapting the sensitometric response of photosensitive media to specific exposure conditions. Among these methods was "hyper-sensitizing" film by applying a low-level overall exposure to the film, prior to recording image content on that image area. This method was often employed for changing film speed. For example, U.S. Pat. No. 4,172,640 (Land) discloses one adaptation of this technique to a motion picture film camera. In the camera apparatus of U.S. Pat. No. 4,172,640 a supplemental low-level exposure source presensitizes the film within the image recording device itself to adapt to low-light conditions just prior to image capture. In a similar spirit, U.S. Pat. No. 3,819,376 (Land), discloses adapting the sensitometry and relative speed of diffusion-type photographic film after coating, using low-level exposure to a sensitizing light source. Providing low-level pre-exposure has also been used as a technique for reducing film contrast when photographing high-contrast scenes.

However, while techniques for pre-exposing photosensitive media with an overall low-level exposure have been practiced to improve film speed or to adjust film contrast for recording images, these techniques have not been applied to optimize watermark application.

Figure 2A:
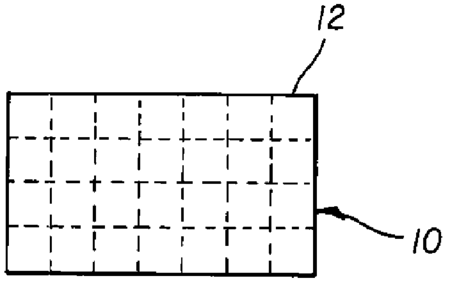
FIG. 2*a* is a plan view showing idealized pixel coverage of an area of a photosensitive medium.

In order to more fully understand the methods and apparatus of the present invention, it is first instructive to consider the nature of watermark imaging, ideally and in actual practice, and to understand what happens when watermark patterns are combined with image content. Referring to FIG. 2*a*, there is shown an idealized plan view of a set of watermark pixels 12 in a portion of an image frame 10. Ideally, each watermark pixel 12 is uniform in shape and adjacent watermark pixels 12 are perfectly aligned and contiguous, with no overlaps or gaps between adjacent pixels 12. If such perfectly shaped and aligned watermark pixels 12 could be formed in practice and there were no pixel-to-pixel exposure variability, there would be fewer imaging anomalies when forming a watermark or other latent indicia, particularly in the imageable area, and correspondingly less need for the two-exposure technique of the present invention.

Effect of Inter-Pixel Gaps

Figure 2B:
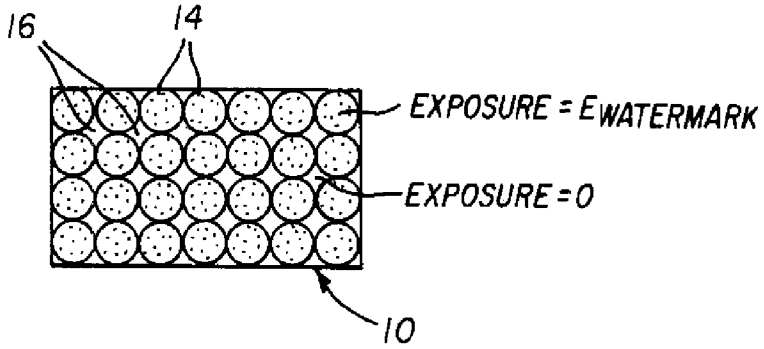
FIG. 2*b* is a plan view showing a more realistic representation of pixel coverage of an area of a photosensitive medium in practice.

Instead of perfectly shaped and contiguous pixels 12, however, the pattern of watermark pixels 14 typically more closely matches the arrangement shown in FIG. 2*b*. That is, watermark pixels 14 do not fully cover their respective areas (represented as rectangles in FIG. 2*a*). In general, watermark pixels 14 are substantially aligned in an array, so that overlapped areas or gaps between adjacent watermark pixels 14 are minimized; however, some amount of overlap or gap is to be expected with most digital exposure array sources. These effects, a result of inevitable design tolerance errors and limitations of mechanical accuracy, are difficult to eliminate fully, regardless of pixel shape. Of particular concern in the depiction of FIG. 2*b* are the unexposed inter-pixel areas 16 that appear between actual watermark pixels 14. Not represented in FIG. 2*b*, but well known to those skilled in the digital imaging arts, are additional problems that further complicate the task of forming pixels 14 in an array. Achieving perfect alignment of pixels 14 can be challenging when using an array of exposure sources. Providing balanced exposure sources, relatively well matched in pixel-to-pixel energy output, can also be difficult.

It is important to emphasize that, unlike the watermark pattern, which is imaged as an arrangement of discrete pixels, the image scene content is spatially "continuous tone" and is not "pixilated." This is true using conventional methods for exposure of a print film for motion pictures, for example, where optical exposure methods are used to expose each full frame of the motion picture. (Even where digital imaging apparatus may be used for writing image scene content, the pixel resolution of the high-quality writing apparatus used for this purpose renders scene content of such fine resolution that the image can be effectively considered as spatially continuous relative to any type of lower-resolution writer that would typically be used for watermark imaging or for forming other types of latent indicia.)

Figure 3:
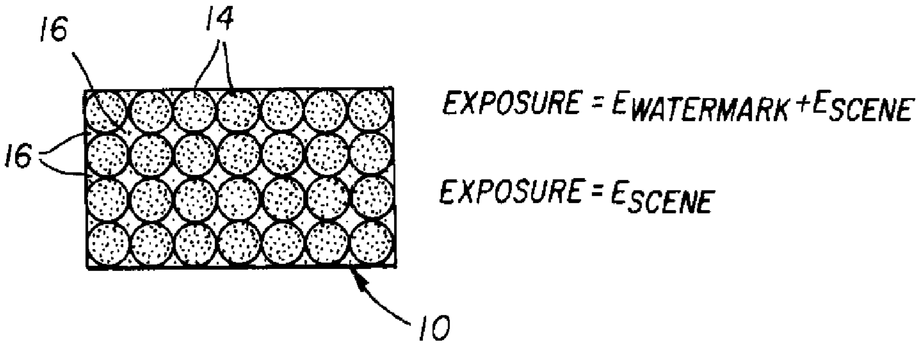
FIG. 3 is a plan view showing the addition of image scene content onto the pixel watermark image of FIG. 2*b;*

Referring now to FIG. 3, there is shown what happens when image content is exposed onto the same image frame 10 of FIG. 2*b*, in which pixels 14 are not perfectly shaped and contiguous and inter-pixel areas 16 are not exposed with the watermark pattern. Because image content is essentially spatially continuous, there are no inter-pixel gaps in the image content. That is, with respect to pixel areas 12 of FIG. 2*a*, the image content effectively covers the full pixel area, as represented in FIG. 3.

Comparing frames 10 of FIG. 2*b* and FIG. 3 in terms of exposure energy, it can be seen that image frame 10 for FIG. 2*b* has the following exposure levels over respective areas:

Watermark pixel 14 areas: Exposure=$E_{watermark}$

Inter-pixel areas 16: Exposure=0 where $E_{watermark}$ is the exposure for the watermark.

When scene content is added, having exposure $E_{scene}$, frame 10 in FIG. 3 has the following exposure energy per area:

Watermark pixel 14 areas: Exposure=$E_{watermark}$+$E_{scene}$

Inter-pixel areas 16: Exposure=0+$E_{scene}$

Empirical results have shown that inter-pixel areas 16 appear significantly less dense than areas of watermark pixels 14 when scene content is added. Thus, with the conditions described above for image frame 10 in FIG. 3, very perceptible patterning effects can result. This patterning is enhanced by the contrast of the photosensitive medium, known as gamma, which is the slope of the D log E curve of FIG. 1 at the density point of the scene content. This gamma is particularly high for motion picture print film, accentuating the patterning effects due to exposure variations, as is described subsequently.

Typical mean level exposures for the watermark may be in the region of 0.15 ergs/cm$^2$ at a wavelength of 550 nm for the green-sensitive layer of a typical photosensitive medium, such as Kodak 2383 Vision Color Print Film (manufactured by the Eastman Kodak Company, Rochester, N.Y.). The minimum and maximum exposure levels of the pixels comprising the watermark pattern can typically range from about 0.14 ergs/cm to about 0.16 ergs/cm$^2$ respectively. To simplify subsequent calculation for this example, a mean value of 0.15 ergs/cm$^2$ for the watermark exposure pattern is used.

A portion of image scene content that is to be reproduced at a density of 1.0 in the green layer requires a nominal exposure of about 1.5 ergs/cm$^2$. Therefore, with reference to FIG. 3, the sum exposure ($E_{total}$) of the scene and mean watermark pixel exposures for areas 14 should approximate 1.5 ergs/cm$^2$.

$$E_{total}=1.50\ \text{ergs/cm}^2$$

$$E_{total}=E_{scene}+E_{watermark}$$

$$E_{watermark}=0.15\ \text{ergs/cm}^2$$

$$E_{scene}=1.50-0.15=1.35\ \text{ergs/cm}^2$$

Inter-pixel areas 16 between watermark pixels 14 receive only 1.35 ergs/cm$^2$ instead of the total 1.50 ergs/cm$^2$. The density difference (ΔD) between these areas, which determines how visible the patterning is, can now be calculated.

$$\Delta D=\gamma_{1.0}\Delta \log E$$

$$\gamma_{1.0}=3=\text{film contrast at 1.0 density (slope of D log E curve)}$$

$$\Delta \log E=\text{Log } E \text{ total}-\text{Log } E \text{ scene}=\text{Log}(E \text{ total}/E \text{ scene})$$

$$E_{total}/E_{scene}=1.50/1.35=1.11$$

$$\text{Log } 1.11=0.041$$

$$\Delta D=3\times(0.041)=0.12 \text{ D}$$

Figure 1:
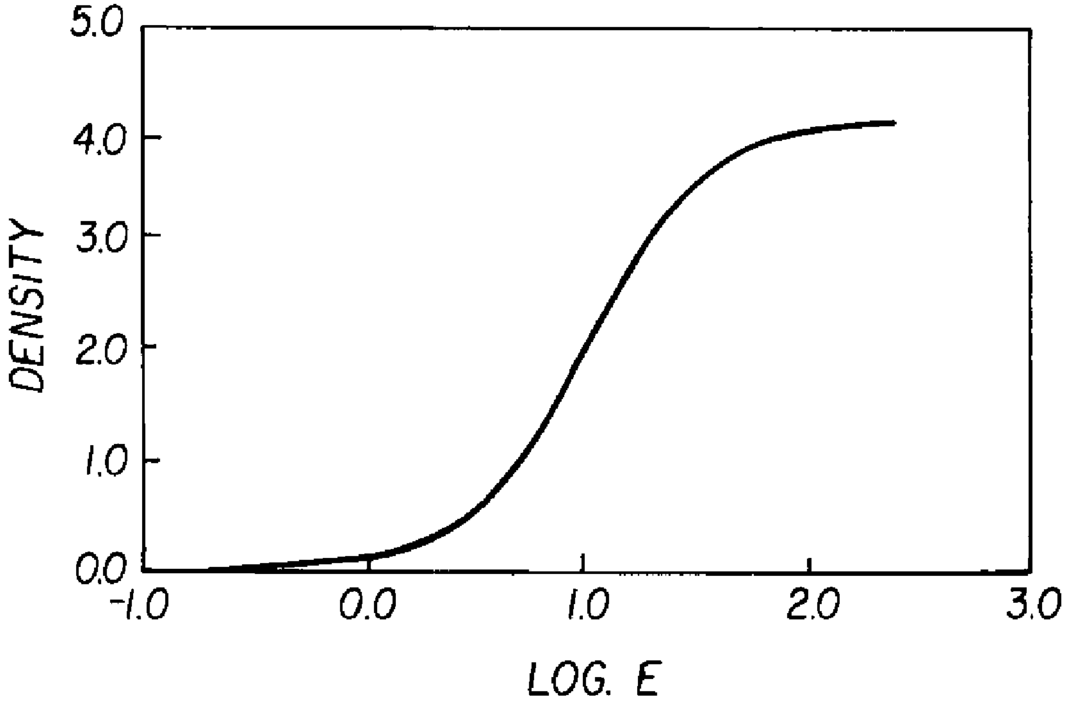
FIG. 1 is a graph showing the characteristic density vs. log exposure characteristics for a typical photosensitive imaging medium.

Given the gamma of the film represented in FIG. 1, at a nominal density for scene content of 1.0, a watermark density difference of 0.12 D is significantly above the threshold of visibility of approximately 0.01 D. Thus, due to the perceptible density difference between watermark pixels 14 and interpixel areas 16, it can be seen that methods of conventional watermark pixel application can cause visible banding or other pixel patterning anomalies.

In order to reduce the visibility of the pattern created by inter-pixel gaps, it is necessary either to eliminate these gaps by improving the pixel exposure device or to expose inter-pixel areas 16 with the same energy as watermark pixels 14. Since, as has been previously discussed, it is not possible to produce perfect pixel patterns without any gaps, the present invention seeks to provide essentially the same exposure to inter-pixel areas 16 as is applied to watermark pixels 14 without compromising the watermark information conveyed by the pixel pattern.

Figure 4A:
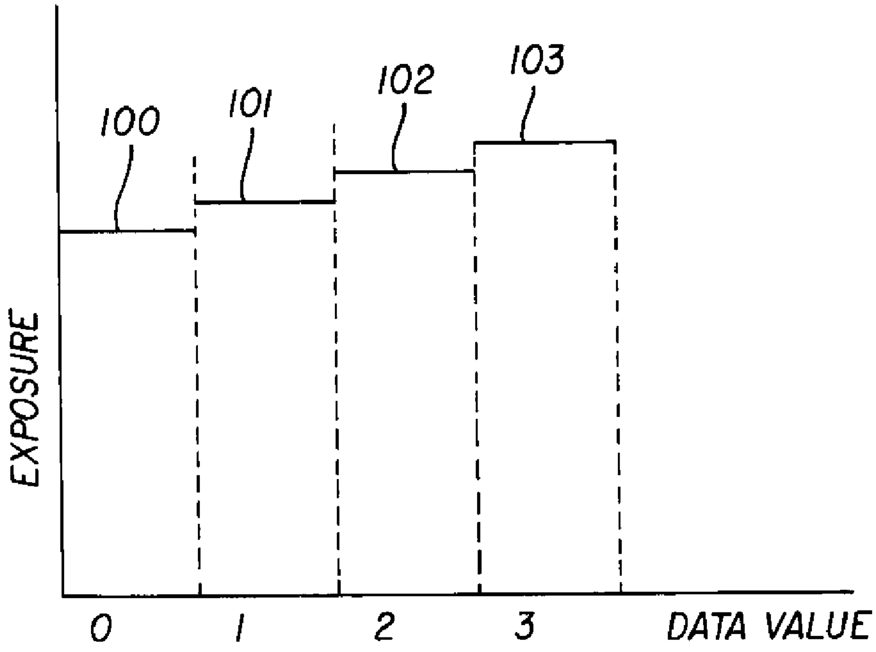
FIG. 4*a* is a graph showing relative power levels applied for a multi-level watermark using conventional techniques.
Figure 4B:
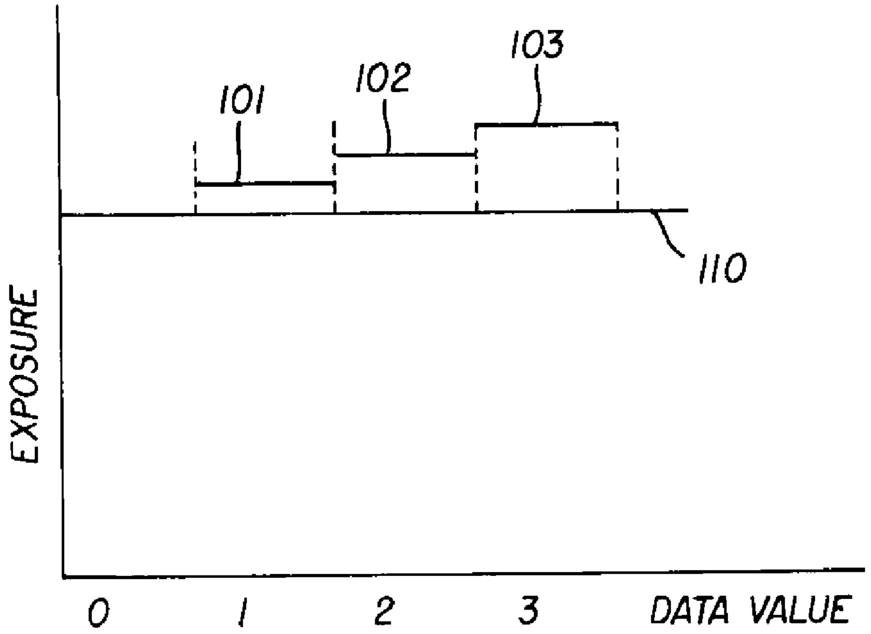
FIG. 4*b* is a graph showing the use of a bias level to the relative power levels shown in FIG. 4*a;*

FIG. 4*a* is a graphical representation of the various exposure levels of watermark pixels 14 comprising the watermark pattern. For the purpose of simplicity, four watermark exposure levels, 100, 101, 102 and 103 representing data values 0, 1, 2 and 3 respectively, are shown; in practice, any number of levels between some minimum exposure level 100 and some maximum level 103 are possible. It can be seen from FIG. 4*a* that the lowest level of exposure of the watermark pattern is not zero. Referring now to FIG. 4*b*, it can be seen that the watermark pattern can be viewed as essentially a "dc bias" level 110 equal in exposure to the minimum exposure level 100 in FIG. 4*a* with the addition of noticeably smaller incremental exposures to effect exposure levels 101, 102 and 103. Using this approach, the task of forming a latent watermark or other indicia can be implemented using two exposures: a uniform overall bias exposure 110 equal to the minimum watermark exposure level 100 and additional pixel exposures that, when added to level 110, provide the resulting data-bearing levels 101, 102 and 103. With this technique, a uniform bias level 110 is applied to the imageable area of the photosensitive medium. Thus, the full exposed area of the photosensitive medium receives this lowest exposure level. Then, since the response of the photosensitive medium to exposure energy is generally additive, only small increments of additional exposure need to be applied in order to achieve the other watermark exposure levels 101, 102, and 103. This two-stage exposure method is the essence of the present invention.

Figure 5:
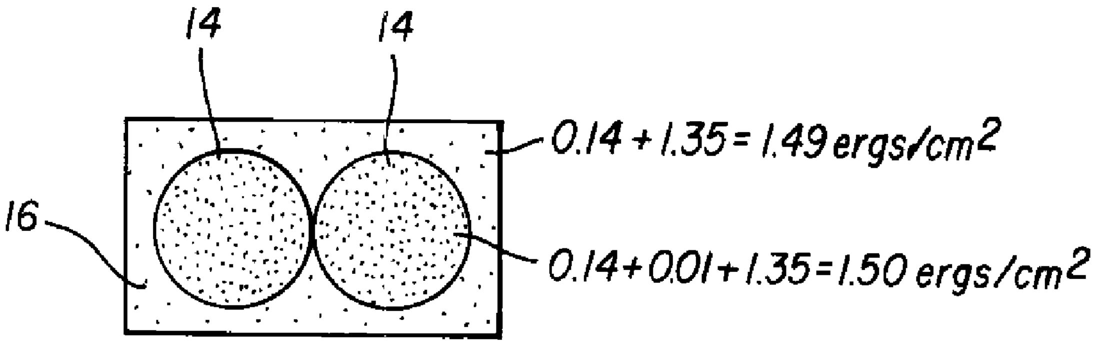
FIG. 5 is a plan view identifying areas of exposure for a pair of watermark pixels.

By forming the watermark or other indicium in two separate exposures as described above, the visibility of the pattern resulting from inter-pixel gaps is significantly reduced. From the previous example, with the lowest watermark exposure at approximately 0.14 ergs/$cm^2$ and the maximum at 0.16 ergs/$cm^2$, the mean exposure level is 0.15 ergs/$cm^2$. The method of the present invention first applies an overall uniform exposure, E bias, of 0.14 ergs/$cm^2$ (the minimum watermark exposure, corresponding to watermark exposure level 100 in FIG. 4*a*) to the photosensitive medium. The additional exposure for watermark pixels now ranges from 0 to 0.02 ergs/$cm^2$, with a mean level of 0.01 ergs/$cm^2$. With a scene exposure, E scene, of 1.35 ergs/$cm^2$, the difference in density between the regions of watermark pixels 14 and inter-pixel areas 16, as shown in FIG. 5, is significantly reduced, as shown in the following calculations:

For inter-pixel areas 16, where E gap is the exposure of the inter-pixel gap:

$$E_{gap}=E_{bias}+E_{scene}$$

$$E_{bias}=0.14 \text{ ergs/cm}^2$$

$$E_{scene}=1.35 \text{ ergs/cm}^2$$

$$E_{gap}=0.14+1.35=1.49 \text{ ergs/cm}^2$$

For watermark pixels 14, with exposure E pixel:

$$E_{pixel}=E_{bias}+E_{watermark}+E_{scene}$$

$$E_{bias}=0.14 \text{ ergs/cm}^2$$

$$E_{watermark}=0.01 \text{ ergs/cm}^2 \text{ (the mean watermark pixel } \mathbf{14} \text{ exposure)}$$

$$E_{scene}=1.35 \text{ ergs/cm}^2$$

$$E_{pixel}=0.14+0.01+1.35=1.50 \text{ ergs/cm}^2$$

The resulting density difference ΔD between inter-pixel areas 16 and watermark pixels 14 is computed using:

$$\Delta D=\gamma_{1.0}\Delta \log E$$

$$\gamma_{1.0}=3=\text{film contrast at 1.0 density (slope of D log E curve)}$$

$$\Delta \log E=\text{Log } E \text{ pixel}-\text{Log } F \text{ gap}=\text{Log}(E_{pixel}/E_{gap})$$

$$E_{pixel}/E_{gap}=1.50/1.49=1.007$$

$$\text{Log } 1.007=0.003$$

$$\Delta D=3\times(0.003)=0.009$$

A watermark density difference of 0.009 is below the threshold of visibility at a nominal scene content density of 1.0. Comparing this result with the outcome of conventional watermark application described above shows the benefit of the method of the present invention for reducing pixel patterning effects in the watermarked image. In this example, density variations between inter-pixel areas and pixel areas have been reduced to 1/13 of those produced by conventional pixel exposure methods.

Additional Benefits of the Current Invention

Exposure Levels

As noted in the background material above, pixel-related patterning effects are only one problem that must be addressed when providing a watermarking scheme that is suitable for motion picture print film and other types of sensitized media. There is also a need to alleviate the requirement for providing high-resolution, high-energy exposure sources for watermark application. An unexpected result of the present invention is that it advantageously addresses energy-related problems in addition to the image related problems just described.

By separating the watermark exposure into an essentially uniform overall exposure and a supplemental pixel exposure, the energy demands for the pixel exposure source are significantly reduced. As shown in the previous examples, the peak level of the watermark pixel exposure is reduced from 0.16 ergs/cm$^2$ to 0.02 ergs/cm$^2$. This results in obvious reduction in the demands upon and complexity of apparatus for producing small, high intensity pixel exposures. The burden of producing the bulk of the exposure energy required for forming the complete watermark has been shifted from the pixel exposure device to an area bias exposure device. The graph of FIG. 4*b* shows, in concept, how a sensitizing exposure of the photosensitive medium to bias level 110 is advantageous for exposure energy sources. Recall that the conventional method described with respect to FIG. 4*a* applied any one of four relatively high energy levels from each source in an array of pixel light sources, and required control of the energy levels to within tight tolerances. In contrast, the method of the present invention applies an overall bias to the full image frame 10 with one uniform light source, then applies one of three incremental energy levels from each exposure energy source. At the low power levels needed for applying this incremental energy, performance tolerances of off-the-shelf light sources are sufficient. Because economical, low-power sources can then be used for providing the additional energy needed for watermark application, the use of a bias exposure to precondition the photosensitive medium provides both energy and cost savings.

Use of an area exposure device also takes advantage of a larger area over which to effect the bias exposure. As is well known in the optical arts, photographic exposure is the product of light intensity and time. For film in motion at high speeds, as is commonly found in film production, exposure times available for pixels are extremely short. For example, pixels with a diameter in the order of a few hundred microns may have exposure times in the order of 1 microsecond. To produce all of the required exposure energy in these short time intervals requires intense pixel exposure illumination. With many of the currently available illumination technologies, such as LEDs for example, achieving the necessary intensity and uniformity can be extremely difficult and expensive. In contrast, the bias exposure as used in the present invention can be applied over a distance of several millimeters or more, taking advantage of longer exposure times, orders of magnitude larger than are available at the pixel level. Thus, shifting most of the exposure burden to the bias exposure apparatus does not require extremely bright illumination sources for either the bias exposure device or the pixel exposure device. The present invention reduces the illumination power demands, reduces apparatus cost, and simplifies its design.

Pixel Overlap Condition

Figure 6:
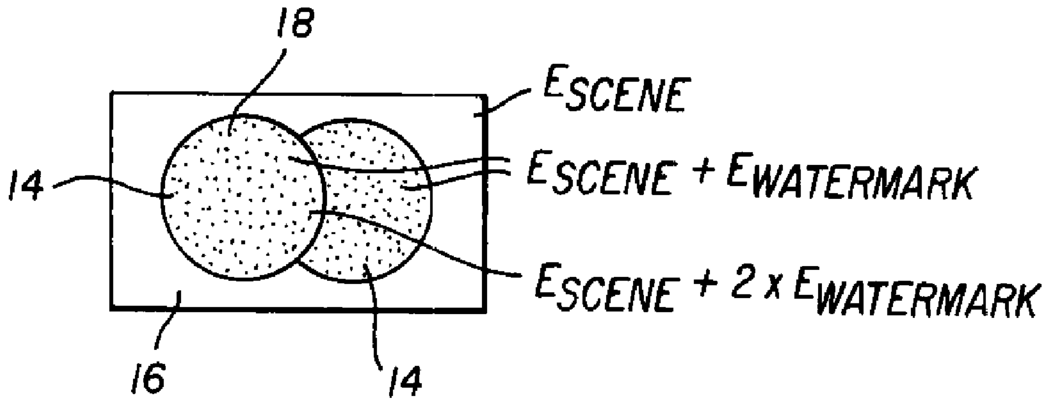
FIG. 6 is a plan view identifying areas of exposure for a pair of partially overlapped watermark pixels.
Figure 7:
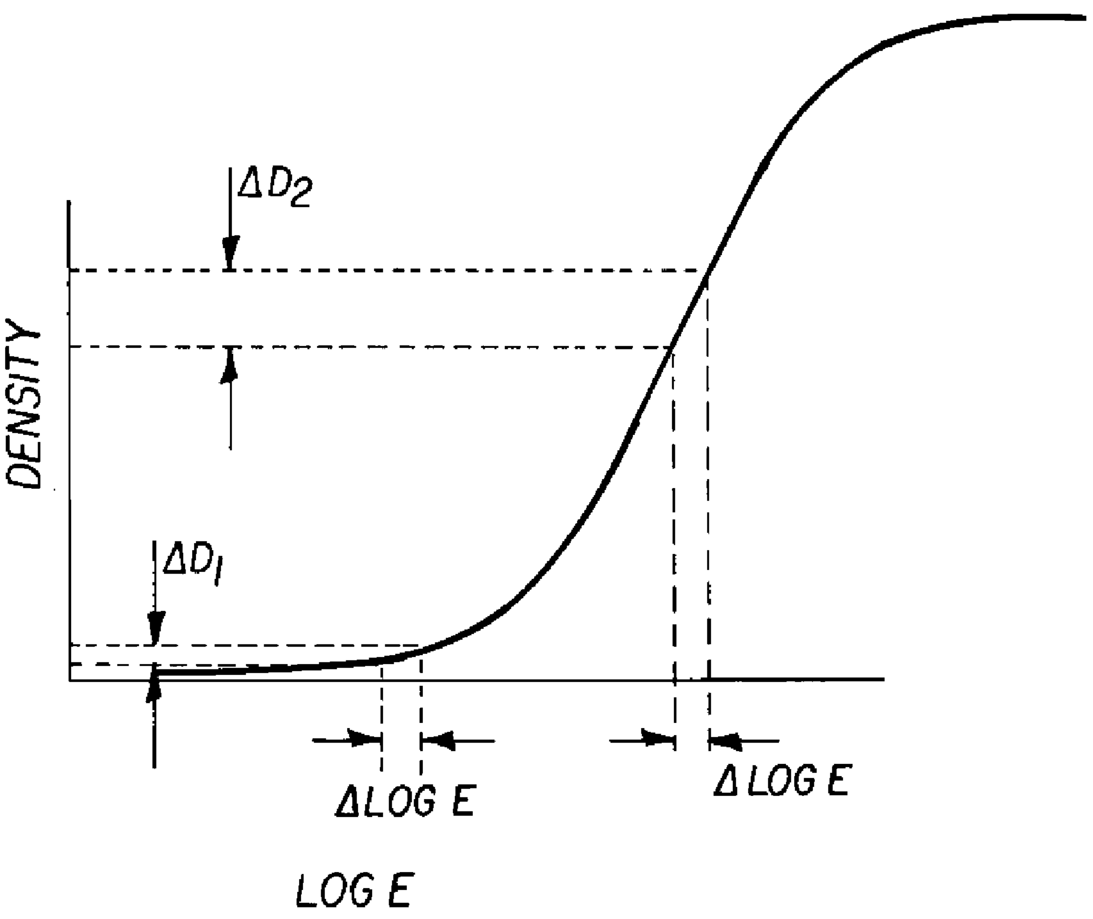
FIG. 7 is a graph showing density variations for exposure difference at different points along the D log E curve.

The advantage of the present invention is even more pronounced when handling pixel overlap conditions that can easily occur due to errors in pixel placement. Referring now to FIG. 6, there are shown two watermark pixels 14 having an overlap area 18. There are three exposure areas to be considered for scene content having watermark pixels 14 with overlap areas 18, as follows:

Inter-pixel area 16: $E_{gap}=E_{scene}$

Non-overlapped pixels 14: $E_{total}=E_{scene}+E_{watermark}$

Overlap areas 18: $E_{overlap}=E_{scene}+(E_{watermark}\times 2)$

Using nominal exposure values given for the description of FIG. 5 given above, it is instructive to first consider the visibility of overlap artifacts when using prior art methods for watermark exposure. Again:

$$\Delta D=\gamma_{1.0}\Delta \log E$$

$$\gamma_{1.0}=3=\text{film contrast at 1.0 density (slope of D log E curve)}$$

$$E_{scene}=1.35 \text{ ergs/cm}^2$$

$$E_{watermark}=0.15 \text{ ergs/cm}^2$$

Of interest here is the difference in density ΔD between overlap areas 18 and inter-pixel areas 16, computed as follows:

$$\Delta \log E=\log E_{overlap}-\log E_{gap}$$

$$\Delta \log E=\log(E_{scene}+2\times E_{watermark})-\log E_{scene}$$

$$\Delta \log E=\log((E_{scene}+2\times E_{watermark})/E_{scene})$$

$$((E_{scene}+(2\times E_{watermark}))/E_{scene}=(1.35+0.30)/1.35 \log 1.22=0.09$$

$$\Delta D=3\times(0.09)=0.27$$

This value represents an extremely large density difference and shows that the effect of a pattern of overlap areas 18 will be visually perceptible. If instead, the watermark exposure is applied into two stages, using the method and apparatus of the present invention to provide an overall bias or background exposure $E_{bias}$, a significant reduction occurs in the density modulation caused by pixel overlap. Here:

$$E_{scene}=1.35 \text{ ergs/cm}^2$$

$$E_{bias}=0.14 \text{ ergs/cm}^2$$

$$E_{watermark}=0.01 \text{ ergs/cm}^2$$

$$\Delta D=\gamma\Delta \log E$$

$$\gamma_{1.0}=3=\text{film contrast at 1.0 density}$$

For the most pronounced density difference ΔD between overlap areas 18 and inter-pixel areas 16, the following calculations can be applied:

$$\Delta \log E=\log(E_{scene}+E_{bias}+2\times E_{watermark})-\log(E_{scene}+E_{bias})$$

$$\Delta \log E=\log ((E_{scene}+E_{bias}+2\times E_{watermark})/(E_{scene}+E_{bias}))$$

$$\Delta \log E=\log((1.35+0.14+2\times 0.01)/(1.35+0.14))$$

$$\Delta \log E=\log(1.51/1.49)=0.006$$

$$\Delta D=3.13(0.006)=0.019$$

This is a reduction in density variation of about 1/15, yielding an imperceptible pattern where overlap occurs.

Exposure Source Imbalance Effects in the Watermark Exposure Array

The method of the present invention is further advantaged in compensating for imbalance between exposure sources in the watermark exposure array. In practice, the latent watermark image is exposed onto the photosensitive medium by transporting the medium past a linear array of pixel exposure sources, such as LEDs, optical fibers or other commonly known pixel-forming devices. In such an application, it is imperative that for any given exposure level, all of the pixel elements within the array produce the same exposure to within very tight tolerances. Otherwise, linear artifacts commonly known as banding are produced on the medium. Different density adjacent lines are perceived by the human visual system essentially as edges, to which an observer is especially sensitive.

In realizable watermark imaging devices, it is impossible to match adjacent pixel exposure sources exactly. They must, however, be matched to within a tolerance that reduces the banding artifact to some level below a visible threshold. These imbalances between pixel exposure sources may be the result of power level differences or may be due to other differences between sources. In the case of multiple source print heads, such as LED arrays for example, power levels may be reasonably matched, but exposure wavelengths may differ from pixel to pixel, causing pixel-to-pixel imbalance. This is because multi-layer photosensitive media such as color films often exhibit strong exposure sensitivity variation with the wavelength of the exposure source. The method and apparatus of the current invention are not only effective in reducing the effects of channel imbalances caused by power level differences, but also compensate for such wavelength variations. By implementing the watermark exposure in accordance with the present invention, the allowable tolerance for pixel exposure matching is significantly increased while maintaining the resultant artifact below the threshold of visibility.

If all of the watermark exposure energy is provided in the conventional manner by the pixel-forming devices, the resultant pattern is highly sensitive to pixel-to-pixel exposure source imbalances. For example, referring to FIG. 8, let an imbalance exist between adjacent exposure sources W1 and W2 with respective watermark exposure levels $E_{W1}$ and $E_{W2}$ such that:

$$E_{W2} > EW1 \text{ by a 10\% error,}$$

with watermark exposure level $E_{W1}$ representing the maximum exposure level 103 as shown in FIG. 4*a*. Therefore, with example values used previously:

$$E_{W1}=0.16 \text{ ergs/cm}^2$$

$$E_{W2}=1.10E_{W1}=0.176 \text{ ergs/cm}^2$$

$$E_{scene}=1.35 \text{ ergs/cm}^2$$

Figure 8:
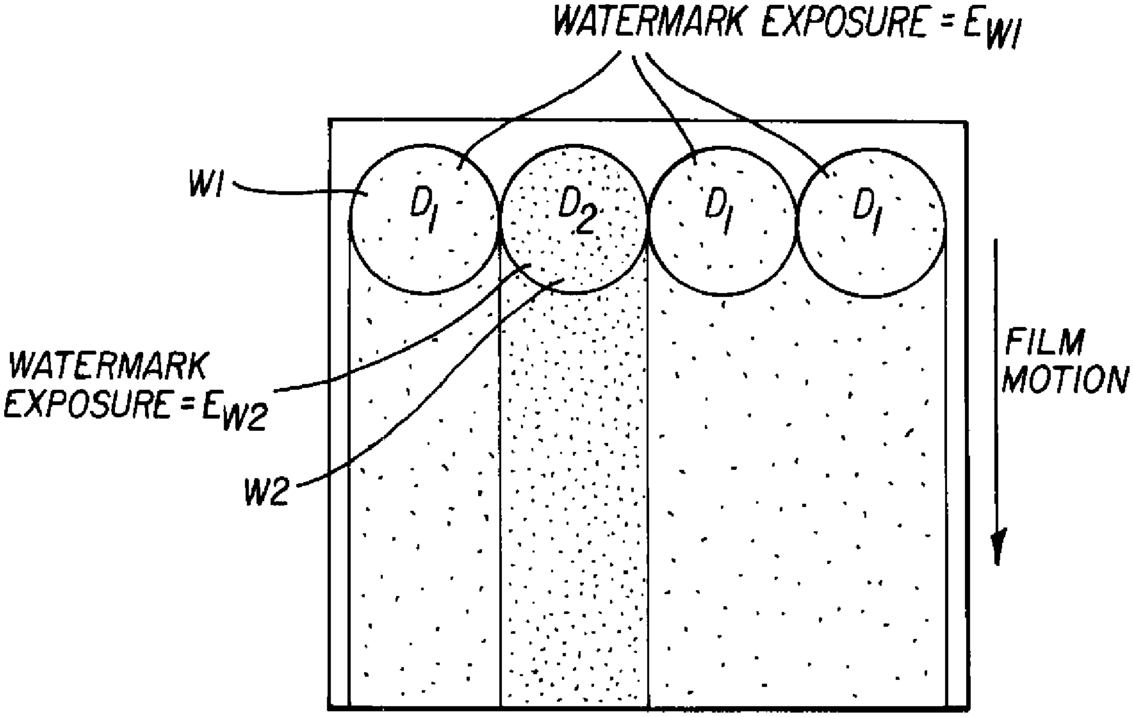
FIG. 8 is a block diagram showing a number of watermark exposure channels.

The exposures received by the sensitized media are $E_1$ and $E_2$, where $E_1$ and $E_2$ are the total exposure levels for adjacent pixels created by exposure sources W1 and W2 respectively.

$$E_1=E_{W1}+E_{scene}$$

$$E_1=0.16+1.35=1.51 \text{ ergs/cm}^2$$

$$E_2=E_{W2}+E_{scene}$$

$$E_2=0.176+1.35=1.526 \text{ ergs/cm}^2$$

$$\Delta \text{ Log } E=\text{Log}(E_2/E_1)=\text{Log}(1.526/1.51)=0.0046$$

$$\Delta D=\gamma\Delta \text{ Log } E$$

$$\gamma_{1.0}=3 \text{ at a nominal scene content density of 1.0}$$

$$\Delta D=3\times(0.0046)=0.014$$

which is slightly above the threshold of visibility. A detectable dark (that is, dense) stripe will be produced along the length of the film, as shown in FIG. 8.

As a counter-example, using the apparatus and method of the present invention, the watermark exposure can be provided using both a uniform bias exposure and a pixel exposure. In such a case, the exposures $E_{W1}$ and $E_{W2}$ are equal to the sum of the bias exposure, E bias (shown as 110 in FIG. 4*b*) and pixel exposure $E_{W1}'$ and $E_{W2}'$, which are equal to the difference between the bias exposure 110 and pixel exposure 103 as shown in FIG. 4*b*.

$$E_{W1}=E_{bias}+E_{W1}\mathbf{40}$$

$$E_{W2}=E_{bias}+E_{W2}'$$

$$E_{bias}=0.14 \text{ ergs/cm}^2$$

$$E_{scene}=1.35 \text{ ergs/cm}^2$$

Again, if a pixel-to-pixel exposure source imbalance exists such that for actual watermark exposure values $E_{W2}'$ and $E_{W1}'$ respectively, $E_{W2}'>E_{W1}'$ by a 10% error:

$$E_{W1}'=0.02 \text{ ergs/cm}^2$$

$$E_{W2}'=1.10(0.02)=0.022 \text{ ergs/cm}^2$$

$$E_{W1}=0.14+0.02=0.16 \text{ ergs/cm}^2$$

$$E_{W2}=0.14+0.022=0.162 \text{ ergs/cm}^2$$

$$E_1=E_{W1}+E_{scene}$$

$$E_1=0.16+1.35=1.510 \text{ ergs/cm}^2$$

$$E_2=E_{W2}+E_{scene}$$

$$E_2=0.162+1.35=1.512 \text{ ergs/cm}^2$$

$$\Delta \text{ Log } E=\text{Log}(E_2/E_1)=\text{Log}(1.512/1.510)=0.0006$$

$$\Delta D=\gamma\Delta \text{ Log } E$$

$$\gamma_{1.0}=3 \text{ at a density of 1.0}$$

$$\Delta D=3\times(0.0006)=0.0018$$

which is significantly below the threshold of visibility. Here, as a result of separating the watermark exposure into two stages according to the present invention, the sensitivity of the system to watermark print head exposure source imbalance errors has been reduced by a factor of approximately 8.

Apparatus for Watermark Exposure

Figure 9:
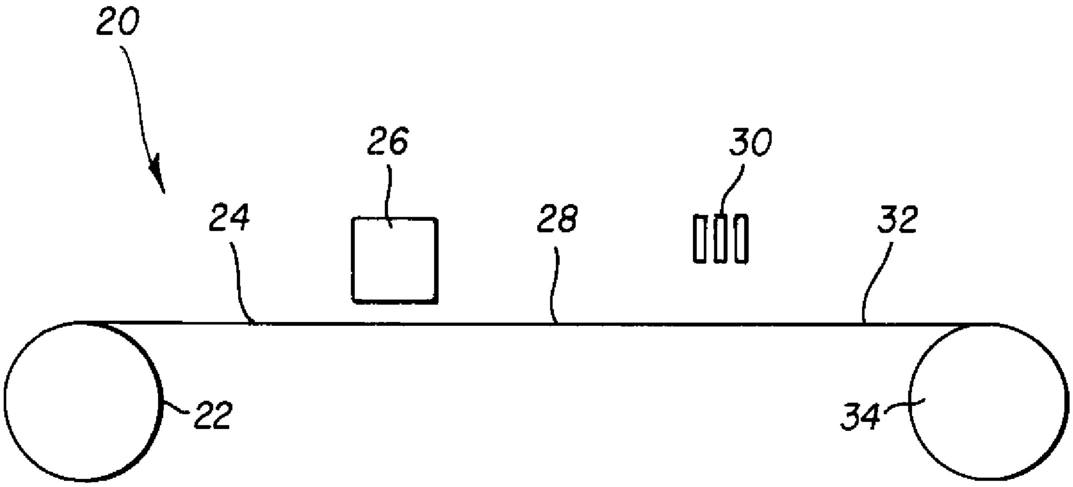
FIG. 9 is a schematic block diagram showing an apparatus for two-stage watermark exposure according to the present invention.

Referring to FIG. 9, there is shown, in schematic block diagram form, a watermark exposure apparatus 20 for applying a two-stage exposure. Unexposed photosensitive medium 24 is provided from a roll 22 or other source. Unexposed photosensitive medium 24 is first exposed at an area energy source 26 that applies a substantially uniform exposure energy onto the surface of unexposed photosensitive medium 24 to form a pre-sensitized photosensitive medium 28. The energy level provided by area energy source 26 corresponds to bias level 110 in FIG. 4*b*. The resulting biased photosensitive medium 24 is pre-sensitized and goes to a pixel exposure source 30. In a preferred embodiment, pixel exposure source 30 is a grouping of one or more LED arrays; however, other types of pixel imaging sources could be used equivalently, such as liquid crystal device (LCD) or digital micromirror device (DMD) spatial light modulators, CRT imagers, light valves, organic light-emitting diodes (OLEDs), or lasers, for example. Pixel exposure source 30 exposes watermark pixels 14 to form a latent watermark image onto a watermarked photosensitive medium 32. Watermarked photosensitive medium 32 can then be wound onto film rolls 34 or be otherwise packaged for use.

Where unexposed photosensitive medium 24 has multiple color-producing layers, a number of alternate arrangements of components in watermark exposure apparatus 20 is possible. For example, a separate area energy source 26 and pixel exposure source 30 could be employed for each color layer, such as one for each of the cyan-, magenta-, and yellow-colorant producing layers of a conventional color motion picture print film, for example. Or, multiple wavelengths could be applied at one or both area energy source 26 and pixel exposure source 30. Alternately, area energy source 26 could provide a "white light" exposure for pre-sensitizing and separate pixel exposure sources 30 could be provided for individual color layers.

It must be noted that exposure by area energy source 26 may be performed before, during, or after exposure by pixel exposure sources 30. For instance, with respect to FIG. 9, the relative positions of area energy source 26 and pixel exposure source 30 could be reversed to provide pixel exposure prior to area exposure. In the embodiment described above, exposure using watermark exposure apparatus 20 is performed prior to exposure to image content; however, the watermark or other latent indicia could be applied following exposure to image content or even during exposure to image content.

Figure 10:
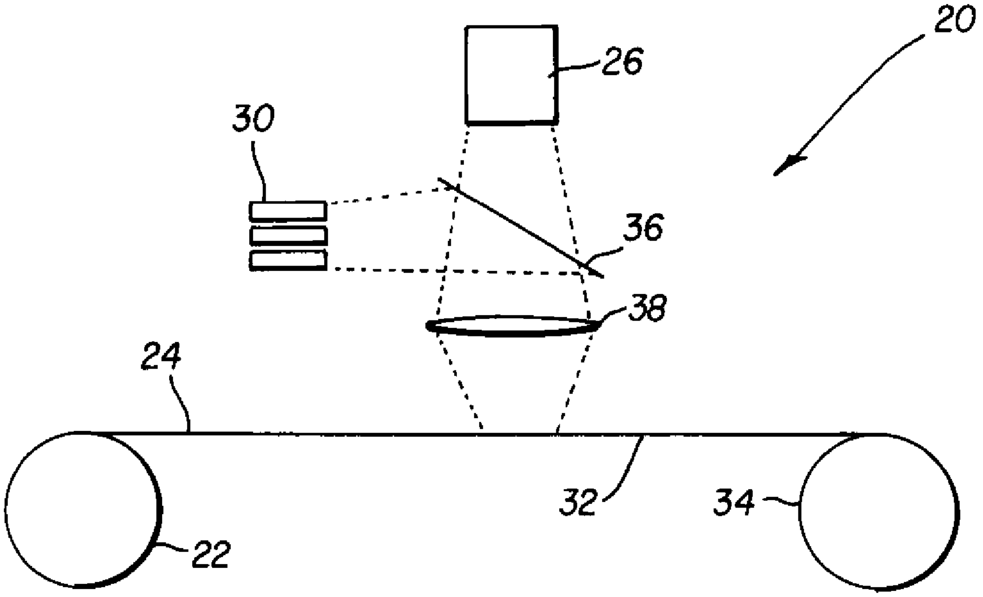
FIG. 10 is a schematic block diagram showing an alternate apparatus for simultaneous watermark exposure from a two stage system according to the present invention.

Referring to FIG. 10, there is shown an embodiment of watermark apparatus 20 that provides simultaneous exposure by both area energy source 26 and pixel exposure source 30. A beamsplitter 36 is used to combine both area and pixel exposure light beams onto the same optical path. A lens 38 or other optical element focuses the combined energy onto unexposed photosensitive medium 24.

Unlike pixel exposure source 30, which exposes individual pixels to form the watermark pattern, area energy source 26 exposes a multi-pixel area with a substantially uniform level of exposure. As a general guideline, uniformity of the exposure level across the imageable area of the photosensitive medium should be within about 10%.

In the embodiments of FIG. 9 and FIG. 10, the broad area sensitization provided by area energy source 26 is applied over the full imageable area of the photosensitive medium; however, exposure of some portion of the imageable area could also be used. The two-stage exposure of the present invention could also be used in the non-imaged area of a photosensitive medium, such as in an area or edge used for batch identification, manufacturer information, or time stamping, for example. Unlike exposure of pixels themselves from pixel exposure source 30, area energy source 26 directs its sensitizing energy over a multi-pixel area in which a number of adjacent pixels may be exposed. It is significant to observe that this broad area exposure occurs over a longer time interval than is available for pixel exposure. Because exposure is the product of intensity and duration, this allows the intensity level of area energy source 26 to be reduced.

The exposure energy provided by area energy source 26 conditions the sensitivity of the photosensitive medium for watermark pixel exposure, whether this broad area exposure energy is applied before, during, or after pixel exposure and before, after, or during image content exposure. It must be noted that light energy is only one form of energy that could be applied for sensitization conditioning of the photosensitive medium. Other types of area sensitizing energy could alternately be applied over a multi-pixel area from an area energy source, such as energy from heat, pressure, or chemical reaction, for example. Area energy source 26 could use a combination having multiple light sources or one or more light sources, or any number of light sources combined with a heat source, or using some other combination of sources for sensitization conditioning. With whatever area energy source 26 is used, the energy applied should be substantially uniform over the multi-pixel area, to provide the necessary conditioning for watermark pixel exposure.

Watermark exposure apparatus 20 is particularly suited for use in high-speed film manufacturing, allowing a latent watermark image, or other types of latent indicia, to be formed onto unexposed photosensitive media 24 with the advantages of robustness and cost described above. As has been noted, watermark application could also be performed following manufacture, such as at a studio site or other location. A camera could even be provided with the needed components for watermark application at or near the time of scene content exposure, thus incorporating watermark exposure apparatus 20 within the camera apparatus.

The invention has been described in detail with particular reference to certain preferred embodiments thereof, but it will be understood that variations and modifications can be effected within the spirit and scope of the invention. For example, this method could be used to apply a watermark or similar latent indicium to any of a number of types of photosensitive media, including negative film, print film, or paper or other type of reflection print medium, for example. The method of the present invention could be more broadly applied to other types of recording medium, such as thermal media, for example. Some examples of the broad class of latent indicia, in addition to watermark patterns, to which the present invention can be applied include pixelated images, time stamps, manufacturing codes, bar codes or other optical encoding.

Area energy source 26 can use any of a number of types of light sources, such as tungsten lamp, xenon lamp, lasers, or LED sources including OLEDs, for example. A light source may also be provided with a uniformizing element for conditioning the light, as is well known in the optical arts. The light source may be pulsed or on continuously during the time interval available for sensitizing exposure. In the broadest sense, area energy source 26 can apply, onto the sensitized medium, any type of sensitizing energy, such as mechanical energy, energy from a chemical reaction, or radiant electromagnetic energy which may or may not be in the visible light spectrum. The sensitized medium may be a photosensitive medium such as film or reflection medium such as photosensitive paper or some other type of medium, such as a thermal or magnetic recording medium, for example. Pixel exposure source 30 could be embodied in a number of ways, with individual exposure sources applying radiant electromagnetic energy over any suitable wavelength range. Of course, pixel exposure source 30 may include lenses and other supporting components for controlling and directing exposure energy. A watermark pattern or other indicium could be formed onto all layers or onto any combination of color-producing layers of a color photosensitive medium, for example.

With the solution of the present invention, a robust method is provided for application of a watermark or other indicia onto a sensitized medium using two-stage exposure. In particular, the method of the present invention offers a low-cost solution to the technical challenge of providing watermark exposure during the manufacturing cycle, where film is produced at high speeds. As has been described, the apparatus and method of the present invention mitigate the visual impact of inter-pixel gaps, pixel overlaps, and other spatial patterning anomalies on watermarked scene content. This method reduces the energy requirements for forming watermark pixels or other indicia on photosensitive media and reduces the need for precision control over exposure energy levels applied to the media.

Thus, what is provided is an improved method and apparatus for providing a watermark pattern or other type of latent indicium using at least two separate exposure stages.

PARTS LIST

10 image frame
12 watermark pixel
14 watermark pixel
16 inter-pixel area
18 overlap area
20 watermark exposure apparatus
22 roll
24 unexposed photosensitive medium
26 area energy source
28 pre-sensitized photosensitive medium
30 pixel exposure source
32 watermarked photosensitive medium
34 roll
36 beamsplitter
38 lens
100 exposure level
101 exposure level
102 exposure level
103 exposure level
110 bias level

The invention claimed is:

1. An apparatus for forming a latent indicium onto a sensitized medium, comprising:

(a) an area energy source for applying a substantially uniform sensitizing energy over an area of the sensitized medium; and (b) a pixel exposure source for applying radiant energy to expose a pattern of pixels onto the area of the sensitized medium for forming the latent indicium.

2. An apparatus according to claim 1 wherein the indicium is a watermark pattern.

3. An apparatus according to claim 1 wherein the sensitized medium is a photosensitive medium.

4. An apparatus according to claim 1 wherein the area energy source applies light.

5. An apparatus according to claim 1 wherein the area energy source is pulsed.

6. An apparatus according to claim 1 wherein the area energy source applies heat.

7. An apparatus according to claim 1 wherein the area energy source applies a chemical.

8. An apparatus according to claim 1 wherein the area energy source is a light source selected from the group consisting of an LED, a laser, a xenon lamp, and a tungsten lamp.

9. An apparatus according to claim 1 wherein the pixel exposure source comprises an LED array.

10. An apparatus according to claim 1 wherein the pixel exposure source comprises at least one laser.

11. An apparatus according to claim 1 wherein the pixel exposure source comprises a CRT.

12. An apparatus according to claim 1 wherein the pixel exposure source comprises a spatial light modulator.

13. An apparatus according to claim 1 wherein the pixel exposure source comprises an LCD spatial light modulator.

14. An apparatus according to claim 1 wherein the pixel exposure source comprises a DMD spatial light modulator.

15. An apparatus according to claim 1 wherein the pixel exposure source comprises a light valve.

16. An apparatus according to claim 1 wherein the sensitized medium is a color film.

17. An apparatus according to claim 1 wherein the sensitized medium is a color print film.

18. An apparatus according to claim 1 wherein the sensitized medium is a reflection print medium.

19. An apparatus according to claim 1 wherein the sensitized medium is a negative film.

20. An apparatus according to claim 1 wherein the area energy source is applied to a portion of the sensitized medium prior to application of radiant energy by the pixel exposure source.

21. An apparatus according to claim 1 wherein the area energy source is applied to a portion of the sensitized medium during application of radiant energy by the pixel exposure source.

22. An apparatus according to claim 1 wherein the area energy source is applied to a portion of the sensitized medium after application of radiant energy by the pixel exposure source.

23. An apparatus according to claim 1 wherein the indicium comprises a time-stamp.

24. An apparatus according to claim 1 wherein the indicium comprises manufacture information.

25. An apparatus according to claim 1 wherein the sensitized medium has exposed image content.

26. An apparatus according to claim 1 wherein the multi-pixel area comprises the imageable area of the sensitized medium.

27. An apparatus according to claim 1 wherein the multi-pixel area comprises at least a portion of the non-imaged area of the sensitized medium.

28. An apparatus according to claim 1 wherein the sensitized medium is a thermal recording medium.

29. An apparatus according to claim 1 wherein the area is a multi-pixel area.

30. An apparatus according to claim 1 wherein the sensitized medium comprises a magnetic recording medium.

31. An apparatus for forming a watermark pattern onto a photosensitive medium, comprising:

(a) an area energy source for applying a substantially uniform sensitizing energy over an area of the photosensitive medium; and (b) a watermark pixel exposure source for exposing a plurality of watermark pixels onto the area of the photosensitive medium for forming a watermark pattern thereby.

32. An apparatus according to claim 31 wherein the area energy source applies light.

33. An apparatus according to claim 31 wherein the area energy source applies heat.

34. An apparatus according to claim 31 wherein the area energy source applies a chemical preconditioning.

35. An apparatus according to claim 31 wherein the area energy source is a light source taken from the group consisting of an LED, a laser, a xenon lamp, and a tungsten lamp.

36. An apparatus according to claim 31 wherein the watermark pixel exposure source comprises an LED array.

37. An apparatus according to claim 31 wherein the watermark pixel exposure source comprises at least one laser.

38. An apparatus according to claim 31 wherein the watermark pixel exposure source comprises a CRT.

39. An apparatus according to claim 31 wherein the watermark pixel exposure source comprises a spatial light modulator.

40. An apparatus according to claim 39 wherein the spatial light modulator is an LCD spatial light modulator.

41. An apparatus according to claim 39 wherein the spatial light modulator is a DMD spatial light modulator.

42. An apparatus according to claim 31 wherein the watermark pixel exposure source comprises a light valve.

43. An apparatus according to claim 31 wherein the photosensitive medium is a color film.

44. An apparatus according to claim 31 wherein the photosensitive medium is a color print film.

45. An apparatus according to claim 31 wherein the photosensitive medium is a reflection print medium.

46. An apparatus according to claim 31 wherein the photosensitive medium is a negative film.

47. An apparatus according to claim 31 wherein the area energy source is applied to a portion of the photosensitive medium prior to exposure by the watermark pixel exposure source.

48. An apparatus according to claim 31 wherein the area energy source is applied to a portion of the photosensitive medium during exposure by the watermark pixel exposure source.

49. An apparatus according to claim 31 wherein the area energy source is applied to a portion of the photosensitive medium after exposure by the watermark pixel exposure source.

50. An apparatus according to claim 31 wherein the area is a multi-pixel area.

51. An apparatus for applying a watermark pattern onto a photosensitive medium, comprising:

(a) an area exposure source for applying a substantially uniform exposure over a multi-pixel area of the photosensitive medium; and (b) a watermark pixel array exposure source for exposing a plurality of pixels onto the multi-pixel area for forming a watermark pattern thereby.

52. An apparatus according to claim 51 wherein the area exposure source is applied to a portion of the photosensitive medium prior to exposure by the watermark pixel exposure source.

53. An apparatus according to claim 51 wherein the area exposure source is applied to a portion of the photosensitive medium during exposure by the watermark pixel exposure source.

54. An apparatus according to claim 51 wherein the area exposure source is applied to a portion of the photosensitive medium after exposure by the watermark pixel exposure source.

55. An apparatus according to claim 51 wherein the area exposure source is pulsed.

56. A camera apparatus for applying a watermark pattern onto a photosensitive medium, comprising:

(a) an area energy source for applying a substantially uniform exposure over a multi-pixel area of the photosensitive medium; and (b) a watermark pixel array exposure source for exposing a plurality of pixels onto the multi-pixel area for forming a watermark pattern thereby.

57. A camera apparatus according to claim 56 wherein the camera apparatus applies the watermark pattern after image content exposure.

58. A camera apparatus according to claim 56 wherein the camera apparatus applies the watermark pattern prior to image content exposure.

59. A camera apparatus according to claim 56 wherein the camera apparatus applies the watermark pattern during image content exposure.

60. A method for forming a latent indicium onto a sensitized medium, comprising:

(a) applying a substantially uniform sensitizing energy over an area of the sensitized medium; and (b) exposing a plurality of pixels onto the area of the sensitized medium, forming a latent pattern thereby.

61. A method according to claim 60 wherein the step of applying a sensitizing energy comprises the step of applying light energy.

62. A method according to claim 60 wherein the step of applying a sensitizing energy comprises the step of applying heat energy.

63. A method according to claim 60 wherein the step of applying a sensitizing energy comprises the step of initiating a chemical reaction.

64. A method according to claim 60 wherein the step of exposing a plurality of pixels comprises the step of energizing an LED array.

65. A method according to claim 60 wherein the step of exposing a plurality of pixels comprises the step of modulating a spatial light modulator.

66. A method according to claim 65 wherein the step of modulating a spatial light modulator comprises the step of modulating a liquid crystal device.

67. A method according to claim 65 wherein the step of modulating a spatial light modulator comprises the step of modulating a digital micromirror device.

68. A method according to claim 60 wherein the step of exposing a plurality of pixels comprises the step of modulating a light valve.

69. A method according to claim 60 wherein the step of exposing a plurality of pixels comprises the step of modulating a CRT.

70. A method according to claim 60 wherein the sensitized medium is a color film.

71. A method according to claim 60 wherein the sensitized medium is a color print film.

72. A method according to claim 60 wherein the sensitized medium is a reflection print medium.

73. A method according to claim 60 wherein the sensitized medium is a negative film.

74. A method according to claim 60 wherein, with respect to the area of the sensitized medium, the step of applying a sensitizing energy precedes the step of exposing a plurality of pixels.

75. A method according to claim 60 wherein, with respect to the area of the sensitized medium, the step of applying a sensitizing energy follows the step of exposing a plurality of pixels.

76. A method according to claim 60 wherein with respect to the area of the sensitized medium, the step of applying a sensitizing energy occurs during the step of exposing a plurality of pixels.

77. A method according to claim 60 wherein the sensitized medium has been previously exposed to image content.

78. A method according to claim 60 wherein the area of the sensitized medium is a multi-pixel area.

79. A method according to claim 60 wherein the step of applying a sensitizing energy comprises the step of energizing an OLED.

80. A method for applying a watermark pattern onto a photosensitive medium, comprising:

(a) applying a substantially uniform exposure over an area of the photosensitive medium to condition the sensitivity of the photosensitive medium; and (b) exposing a plurality of pixels onto the area of the photosensitive medium, forming a watermark pattern thereby.

81. A method according to claim 80 wherein the step of exposing a plurality of pixels comprises the step of energizing an LED array.

82. A method according to claim 80 wherein the step of exposing a plurality of pixels comprises the step of modulating a spatial light modulator.

83. A method according to claim 82 wherein the step of modulating a spatial light modulator comprises the step of modulating a liquid crystal device.

84. A method according to claim 82 wherein the step of modulating a spatial light modulator comprises the step of modulating a digital micromirror device.

85. A method according to claim 82 wherein the step of exposing a plurality of pixels comprises the step of modulating a light valve.

86. A method according to claim 80 wherein the step of exposing a plurality of pixels comprises the step of modulating a CRT.

87. A method according to claim 80 wherein the photosensitive medium is a color film.

88. A method according to claim 80 wherein the photosensitive medium is a color print film.

89. A method according to claim 80 wherein the photosensitive medium is a reflection print medium.

90. A method according to claim 80 wherein the photosensitive medium is a negative film.

91. A method according to claim 80 wherein, with respect to the area of the photosensitive medium, the step of applying a substantially uniform exposure precedes the step of exposing a plurality of pixels.

92. A method according to claim 80 wherein, with respect to the area of the photosensitive medium, the step of applying a substantially uniform exposure follows the step of exposing a plurality of pixels.

93. A method according to claim 80 wherein with respect to the area of the photosensitive medium, the step of applying a substantially uniform exposure occurs during the step of exposing a plurality of pixels.

94. A method according to claim 80 wherein the photosensitive medium has been exposed to image content.

95. A method according to claim 80 wherein the area of the photosensitive medium is a multi-pixel area.

96. A method according to claim 80 wherein the step of applying a substantially uniform exposure comprises the step of activating an OLED.

97. A method according to claim 80 wherein the step of applying a substantially uniform exposure comprises the step of pulsing a light source.

98. A photosensitive medium comprising a watermark pattern formed by application of a substantially uniform sensitizing energy and by exposure to a pixel exposure source.

99. A photosensitive medium according to claim 98 wherein the photosensitive medium is a motion picture print film.

100. A photosensitive medium according to claim 98 wherein the photosensitive medium is a color film.

101. A sensitized medium bearing a latent indicium as a pixel pattern, the latent indicium formed by applying a substantially uniform sensitizing energy over a multi-pixel area of the sensitized medium and by applying a pixel exposure energy within the multi-pixel area to form the pixel pattern thereby.

* * * * *